Figure 1A:
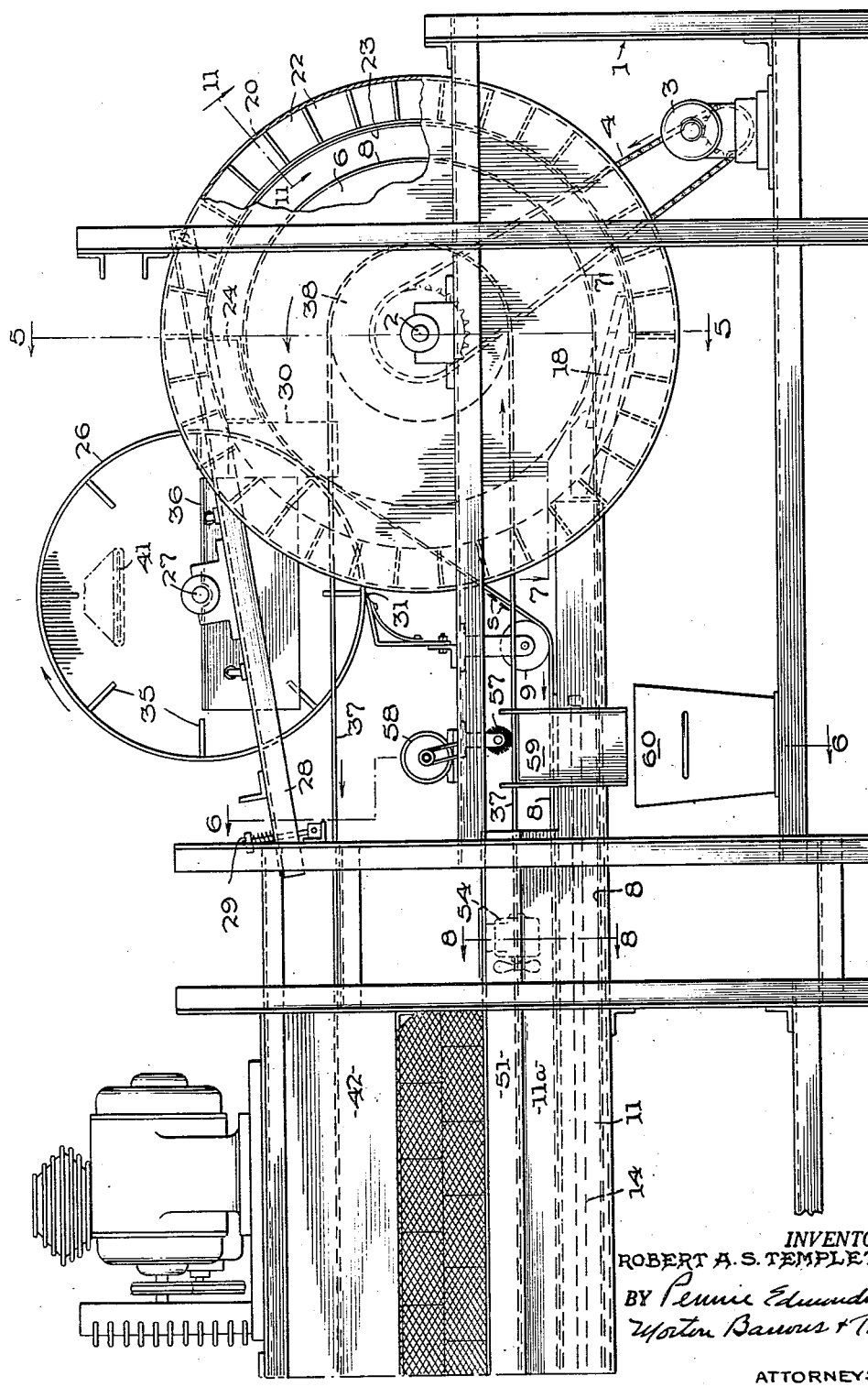

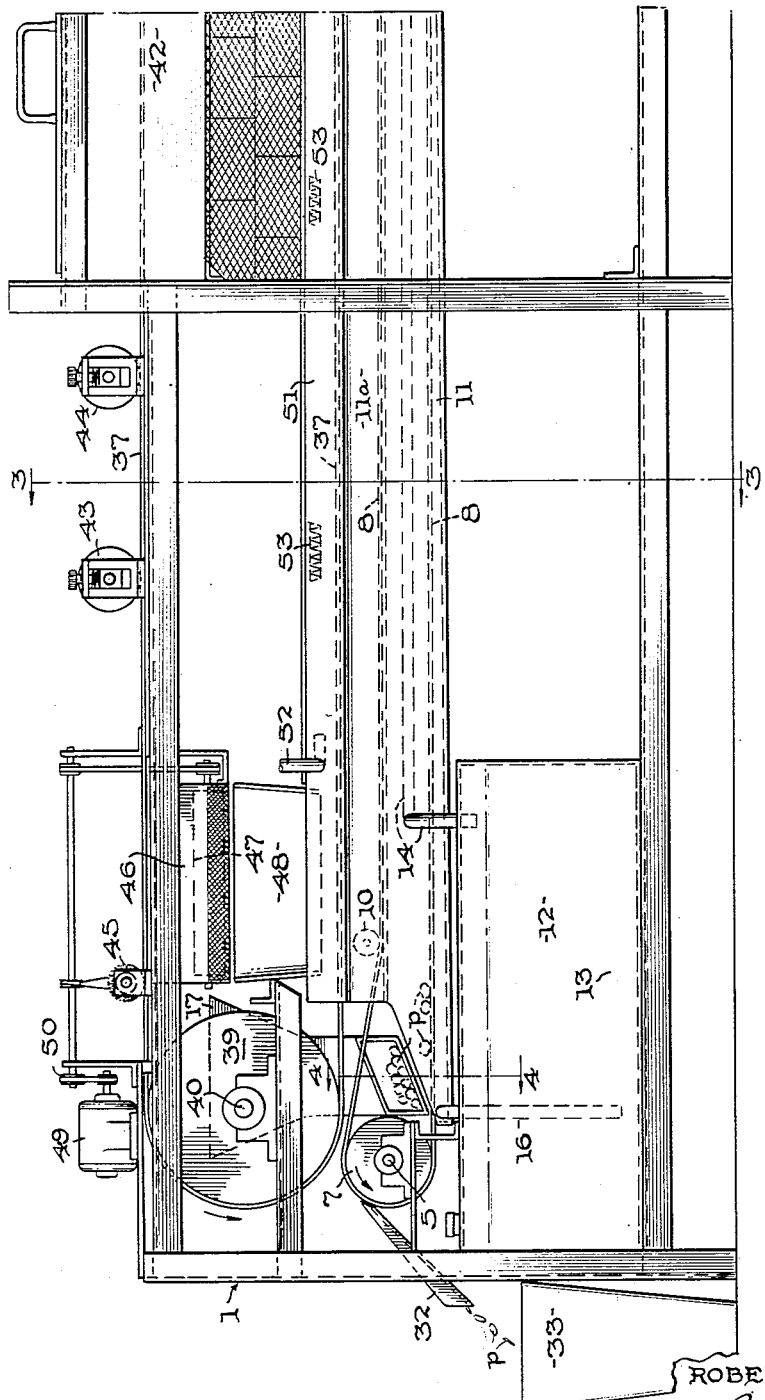

April 16, 1957 R. A. S. TEMPLETON 2,788,732
APPARATUS FOR PREPARING DRIED FOOD AND OTHER PRODUCTS
Filed Jan. 17, 1952 7 Sheets-Sheet 2

INVENTOR.
ROBERT A. S. TEMPLETON
BY Pennie Edmonds
Morton Barrows & Taylor
ATTORNEYS

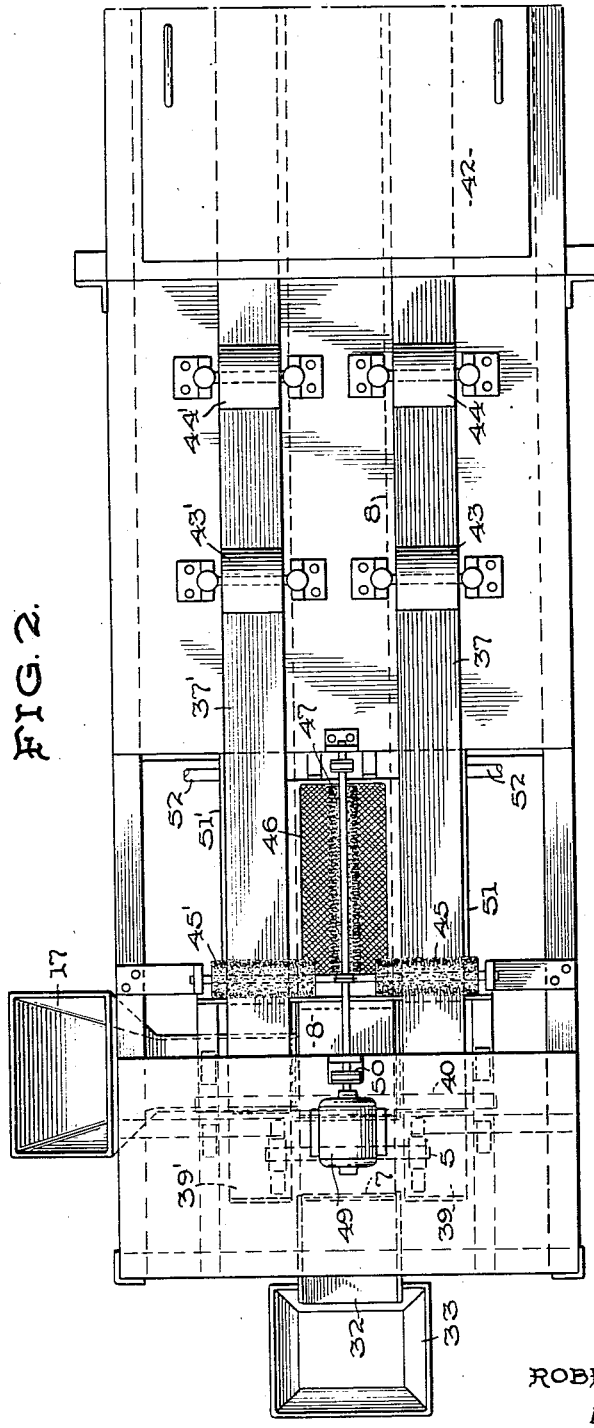

April 16, 1957  R. A. S. TEMPLETON  2,788,732
APPARATUS FOR PREPARING DRIED FOOD AND OTHER PRODUCTS
Filed Jan. 17, 1952  7 Sheets-Sheet 4
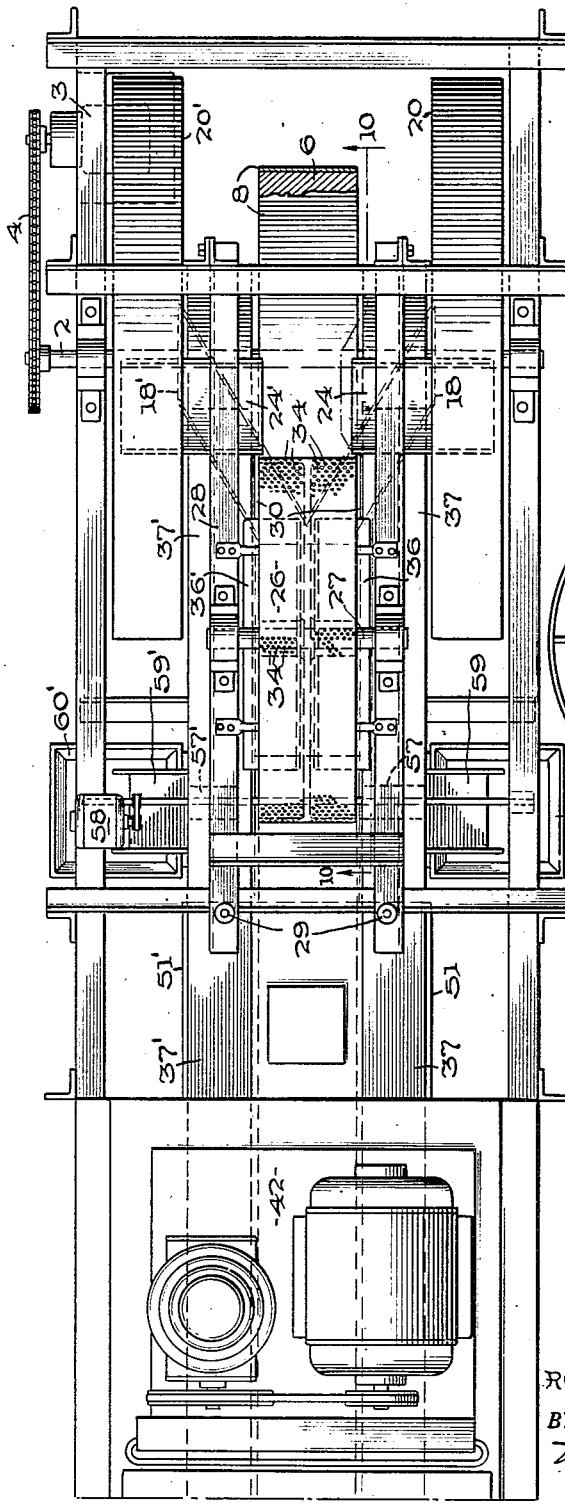
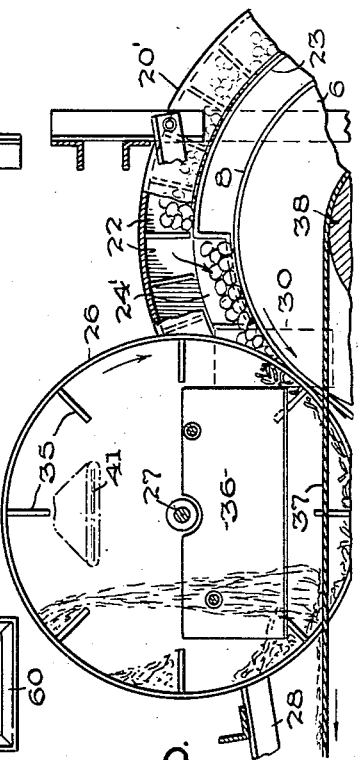
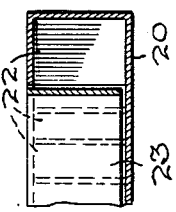
INVENTOR.
ROBERT A. S. TEMPLETON
BY
ATTORNEYS April 16, 1957 R. A. S. TEMPLETON 2,788,732
APPARATUS FOR PREPARING DRIED FOOD AND OTHER PRODUCTS
Filed Jan. 17, 1952 7 Sheets-Sheet 5

INVENTOR.
ROBERT A. S. TEMPLETON
BY
ATTORNEYS

April 16, 1957 R. A. S. TEMPLETON 2,788,732
APPARATUS FOR PREPARING DRIED FOOD AND OTHER PRODUCTS
Filed Jan. 17, 1952 7 Sheets-Sheet 6
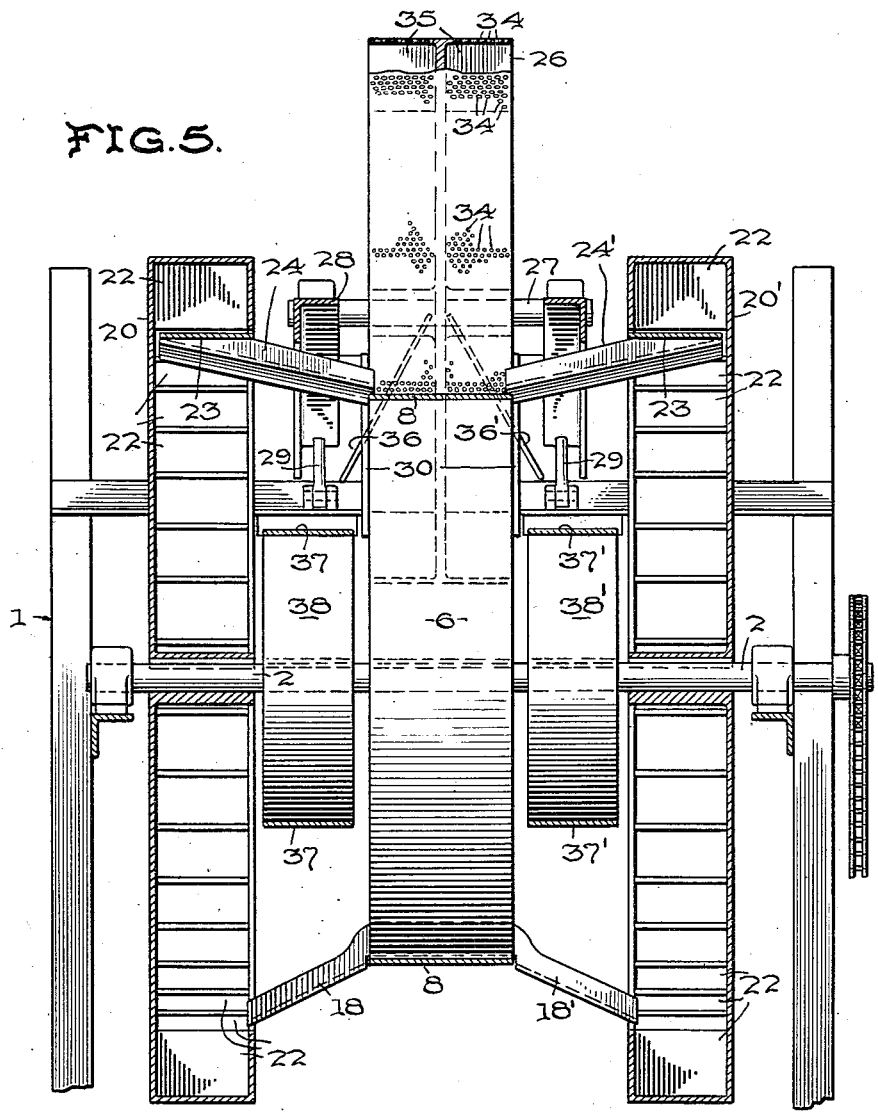
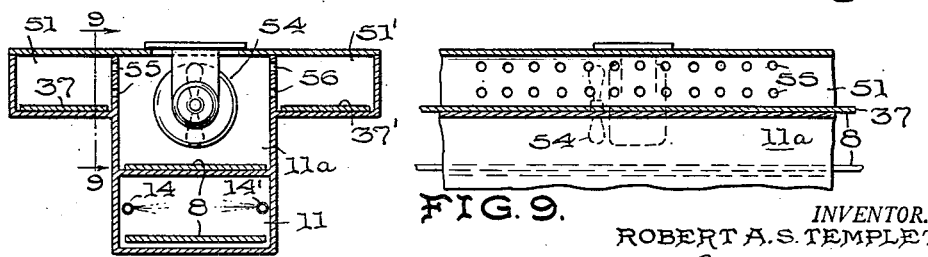
INVENTOR.
ROBERT A. S. TEMPLETON
ATTORNEYS April 16, 1957     R. A. S. TEMPLETON     2,788,732
APPARATUS FOR PREPARING DRIED FOOD AND OTHER PRODUCTS
Filed Jan. 17, 1952     7 Sheets-Sheet 7
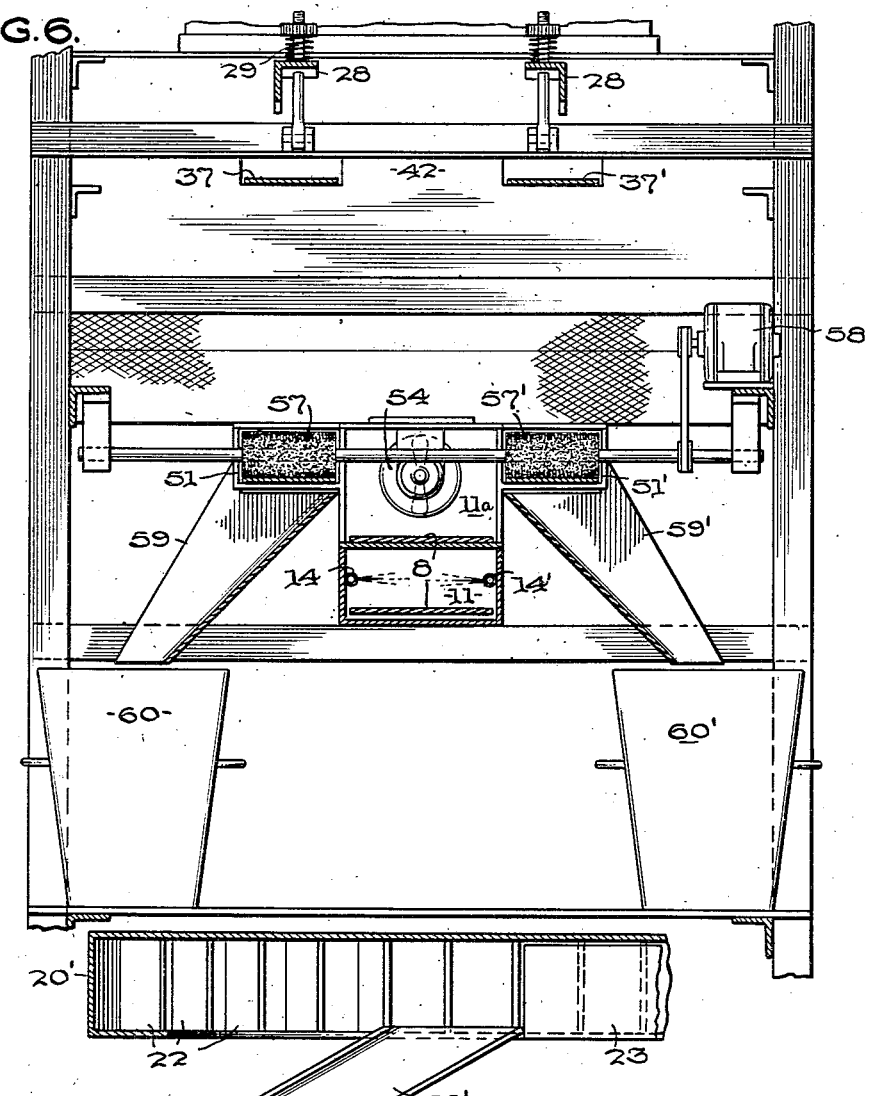
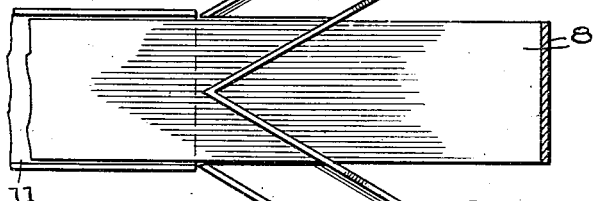
INVENTOR.
ROBERT A. S. TEMPLETON
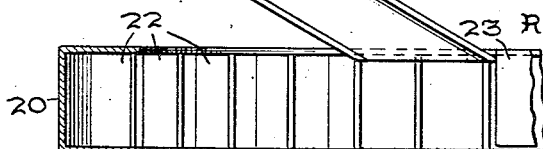
ATTORNEYS

United States Patent Office 2,788,732
Patented Apr. 16, 1957

2,788,732

APPARATUS FOR PREPARING DRIED FOOD AND OTHER PRODUCTS

Robert Alexander Spencer Templeton, London, England

Application January 17, 1952, Serial No. 266,805

9 Claims. (Cl. 99—246)

This invention relates to apparatus for treating food and other substances, and particularly to apparatus for the dehydration of foodstuffs to provide a dry powdery product capable of being reconstituted readily by the addition of water or milk into an edible food product comparable to that produced from the fresh foodstuff.

Various methods have been proposed whereby cooked starchy vegetables, such as potatoes, can be reduced to a dry powder composed of individual cells or aggregates thereof which are substantially intact and, therefore, capable of reconstitution by the addition of water, or milk, or both, into a dish of the mashed foodstuff, for example, as proposed by the patent to Rivoche No. 2,520,891, in which potatoes or other starchy foodstuffs after being cooked are cooled to near the freezing point, or actually are frozen, a part of the water content removed by mechanical means, the partially-dried product formed into a damp product by mixing with previously-dried foodstuff of like kind until the moisture content of the resulting mixture is less than 50%, and the resultant damp product then is subjected to a final drying operation to produce a dry powder containing from about 6 to 12% moisture.

The method of the above patent, and others which have been proposed, are not entirely satisfactory in commercial operation, since one or more of the necessary steps have to be conducted as a batch operation, which necessarily causes interruptions, and often delays, in the operations, as well as a greater use of manpower and concomitant increase in operational costs. The attendant interruptions and delays inherent in any batch operation tends toward the production of a product of non-uniform quality, and, when the process is one involving damp foodstuffs, may even result in actual deterioration of the product, since fermentation or other types of spoilage readily occur in damp food products.

The primary object of the present invention is to provide an apparatus whereby all the steps necessary in treating the foodstuff, from its raw state to its final dehydrated form, may be conducted successively and automatically in a continuous manner, so that the disadvantages of the prior methods and apparatus, as indicated above, are overcome and a uniform dehydrated foodstuff of high quality is obtained. Consequently, the present invention contemplates apparatus in which the foodstuff, of which the potato will be used as an example, may be in seriatim (a) cooked, preferably in its skin, (b) the skin removed from the pulp, (c) the removed skins dried and delivered from the apparatus to a suitable container, (d) the separated pulp mashed, (e) the mashed pulp partially dried, (f) the partially dried product frozen, (g) the frozen product thawed while simultaneously or immediately thereafter removing the water liberated from the cells by the freezing operation, preferably partly by evaporation and partly by pressure and absorption, (h) the mashed product is powdered or granulated, (i) the powdered mashed or granulated product of reduced water content is subjected to a final drying operation, and (j) the final dried powder or granules delivered to a suitable container.

The invention will be further described in connection with the accompanying drawings in which a preferred form of apparatus for treating potatoes is illustrated.

Figure 3:
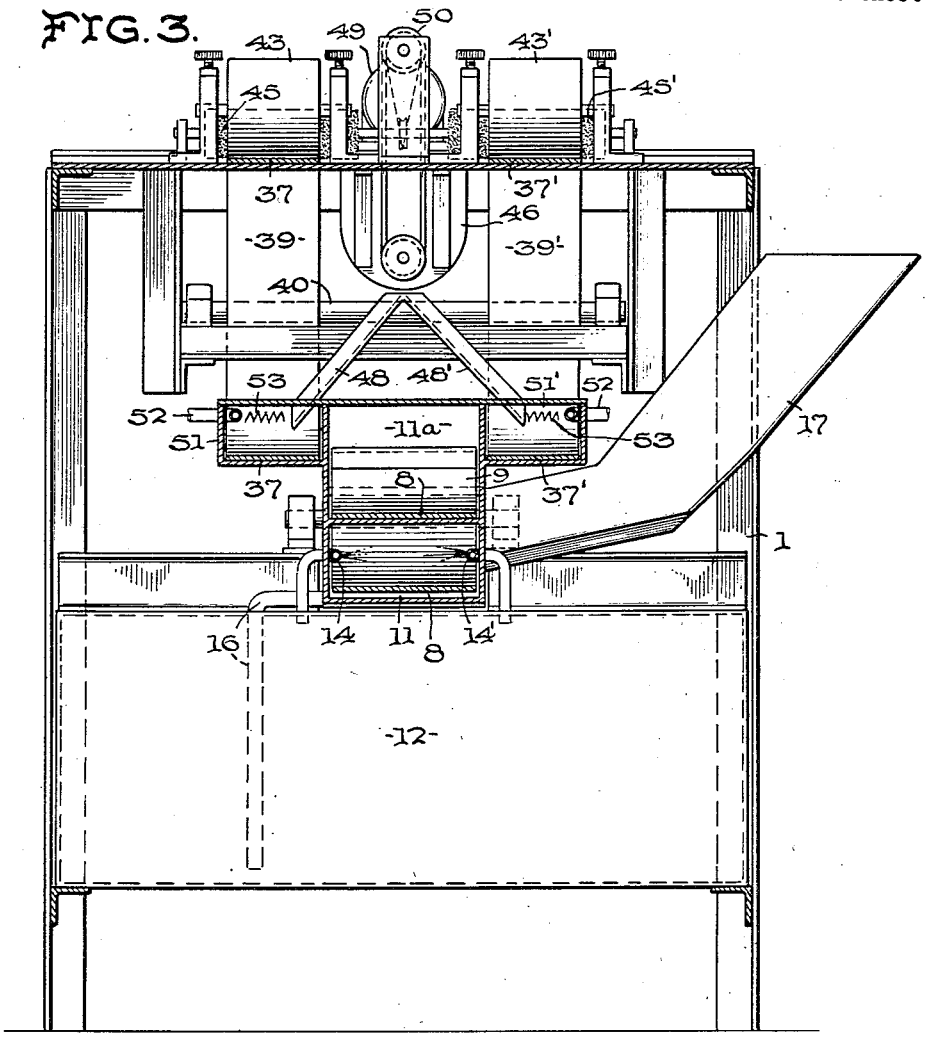
Figure 4:
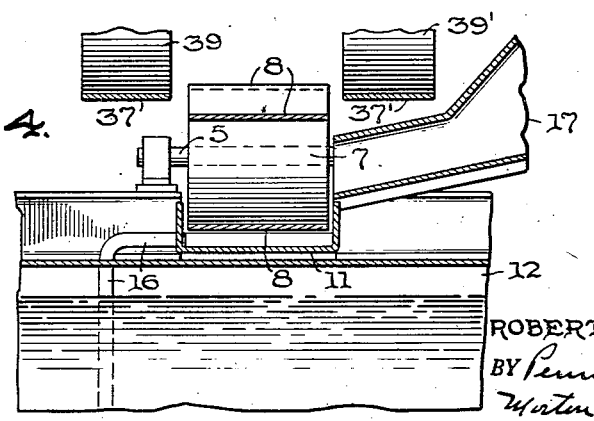

In the drawings:

Fig. 1 is a side elevational view of one end of an apparatus for the continuous treatment of potatoes in accordance with the present invention, the end of the machine shown being that into which raw potatoes are fed, Fig. 1a is a side elevational view of the other end of the apparatus, Fig. 2 is a plan view of the end of the apparatus shown in Fig. 1, Fig. 2a is a plan view of the end of the apparatus shown in Fig. 1a, Fig. 3 is a transverse sectional view taken on line 3—3 of Fig. 1, Fig. 4 is a sectional view taken on line 4—4 of Fig. 1, Fig. 5 is a transverse sectional view taken on line 5—5 of Fig. 1a, Fig. 6 is a transverse sectional view taken on line 6—6 of Fig. 1a, Fig. 7 is a generally horizontal sectional view taken on line 7—7 of Fig. 1a, Fig. 8 is a vertical sectional view taken on line 8—8 of Fig. 1a, Fig. 9 is a sectional view taken on line 9—9 of Fig. 8, Fig. 10 is a vertical sectional view taken on line 10—10 of Fig. 2a, and Fig. 11 is a detail sectional view taken on line 11—11 of Fig. 1a.

The apparatus shown in the drawing comprises a main frame 1 including connected upright, longitudinal and transverse members, preferably angle irons.

A main drive shaft 2 extends transversely of the main frame near the end of the apparatus shown in Fig. 1a and has its ends journaled in bearings supported on longitudinally-extending frame members at that end of the apparatus. The shaft 2 is driven from a suitable source of power, such as an electric motor 3 through chain and sprocket gearing 4. An idler shaft 5 extends transversely across the apparatus adjacent the opposite end thereof and is likewise journaled in bearings supported on the main frame. Pulleys 6 and 7 are mounted on the shafts 2 and 5, respectively, with pulley 6 being driven by the shaft 2. A belt or band 8 of heat-resisting material, for example, steel, is trained about the pulleys, with the upper flight thereof passing beneath guide rolls 9 and 10.

The lower flight of the belt 8 passes through a cooking tunnel 11 which may be heated in any appropriate manner, but preferably by steam or other hot vapor introduced directly into it. Thus, water in a tank 12 may be heated by immersed coils or an electric heater 13 to furnish steam which is supplied to steam manifolds 14 and 14' extending lengthwise along opposite sides of the cooking tunnel 11. Steam from the manifolds 14 and 14' is introduced directly into the cooking tunnel at spaced intervals lengthwise thereof from perforations extending through the inner sides of the manifolds. The bottom of the cooking tunnel is inclined downwardly in the direction of the tank 12 sufficiently to cause water of condensation collecting thereon to flow back therealong to the end, where it is discharged through a pipe 16 and passes back into the water tank 12, beneath the water level therein.

The upper surface of the lower flight of the belt 8 forms a conveying surface for raw, unpeeled potatoes p which are fed thereto from a supply hopper 17. If desired, the hopper 17 may be provided with any suitable means to cause a regulated uniform flow of potatoes onto the lower flight of the belt 8.

The belt 8 moves in a counterclockwise direction so that raw potatoes fed onto the lower flight thereof are carried lengthwise through the cooking tunnel where they are sprayed by steam from the perforations in the steam manifolds 14 and 14'.

The belt 8 is driven at a speed such that the potatoes remain in the cooking tunnel for a length of time sufficient to bring about their effective cooking. This may vary from a minimum of thirty-five minutes to a maximum of sixty minutes, depending upon the average size of the potatoes, the extent to which it is desired to cook them, and other factors.

After emerging from the cooking tunnel 11, the cooked potatoes are discharged laterally from the belt 8, along inclined ways 18 and 18' into rotary elevators 20 and 20' mounted on the main drive shaft 2 adjacent its respective ends. The potatoes are received in the peripheral pockets 22 of the rotary elevators and are carried upwards, in a counterclockwise direction. The pockets 22 are open at their inner sides to receive the potatoes, and the potatoes are maintained in the pockets as the elevators rotate by a stationary arcuate retaining plate 23 which extends to a point substantially vertically above the shaft 2. As the rotation of the elevators carry the respective pockets beyond the upper edge of the retaining plate 23, the potatoes drop from the open sides of the pockets onto downwardly and inwardly-inclined guide plates 24 and 24' from which they pass into a well formed by the pulley 6 over which the belt 8 is passing in its return movement and a roll 26 mounted on an idler shaft 27 journaled in bearings on an auxiliary base 28 resiliently supported from the main frame by adjustable spring hold-downs 29. If desired, the guide plates 24 and 24' may be vibrated to facilitate movement of the potatoes over them into the well. The potatoes are maintained in the well against lateral displacement by side plates 30.

The roll 26 is resiliently pressed into tight engagement with the outer surface of the belt 8 passing around the pulley 6 by the spring hold-downs 29 so that the roll is driven by the frictional contact in a direction to feed the potatoes from the well into the bight between the rotating roll and the moving belt, with the result that the potatoes are squashed and the pulp forced from the skins. The tension of the springs 29 is so regulated that the roll 26 bears with such force against belt 8 that only the paper-thin potato skins s are carried through the bight by the returning belt. A scraper blade 31 engages the outer surface of the roll 26 to scrape therefrom any potato skins adhering to it and to cause them to fall back onto the upper surface of the returning upper flight of the belt. In its return movement, the upper flight of the belt travels through a tunnel 11a extending along the upper surface of the hot cooking tunnel 11. The skins being conveyed by the belt are thus heated sufficiently to evaporate such moisture as they contain. The dried skins move along on the belt until the belt passes over the pulley 7, when they are discharged through the chute 32 into a suitable receptacle 33.

The roll 26 is perforated, with the perforations 34 preferably having a maximum length in any direction of from one-sixteenth to one-quarter inch.

The potato pulp after being completely separated from the skin, is forced through the perforations of the roll to the inner side thereof in the form of "threads" corresponding in their cross-sectional dimensions to the shape of the perforations.

The potato threads are conveyed around and upwardly in a clockwise direction by the roll 26, being held against any substantial movement by plates or vanes 35 extending inwardly from the inner surface of the roll, until they approach the upper vertical center of the roll, when they drop off from the inside of the roll onto downwardly-inclined guide plates 36 and 36' which deliver them onto the upper surfaces of the upper flights of endless absorbent belts 37 and 37', preferably of cotton fabric. The endless absorbent belts pass around pulleys 38 and 38' non-rotatably secured to the main drive shaft 2, by which the pulleys 38 and 38' are driven, and idler pulleys 39 and 39' secured on an idler shaft 40 mounted in bearings on the main frame. Any threads which do not drop from the roll the first time around will be carried back and forced from the roll by the next set of threads forced through the perforations.

From the time the potato threads emerge on the inside of the roll 26 they are subjected to a blast of hot air from any suitable source, such as 41. As the potato threads still have most of the heat from the cooking operation and present a large surface area, the evaporation of an appreciable amount of the water from them by the hot air blast is readily effected by the time the threads begin to drop away from the inside of the roll onto the inclined guide plates 36 and 36' for delivery to the absorbent belts. The evaporation of the moisture from the potato threads will cause them to lose most of the heat imparted to the potatoes during the cooking operation. The cooling of the potato threads also continues as they are carried along by the upper flights of the belts 37 and 37' until the potato threads enter a refrigerating apparatus 42, the specific construction of which forms no part of the present invention. The refrigerating apparatus is so operated that by the time it takes the potato threads to traverse it, they will be completely frozen.

The cooking of the potatoes causes a gelatinization of the starch with the water of the potato, so that the water of the potato no longer is in the free state and therefore is difficult to remove. The freezing of the potato threads results in the formation of ice crystals which separate from the gel, thereby again putting the water in the free state so that, when the threads subsequently are thawed, the water is much more readily removed.

After the frozen potato threads emerge from the refrigerating apparatus they pass beneath rollers, 43, 43', 44 and 44' mounted in spring-adjustable bearings supported on the main frame. These rollers complete the thawing of the potato threads and squeeze out a portion of the water liberated by the freezing operation, which is absorbed by the absorbent belts 37 and 37'. The tension on the rollers 43, 43', 44 and 44' preferably is so adjusted that the combined effect of the hot air blast to which the threads are subjected in the roll 26 and the absorption of the belts 37 and 37' is such that the potato particles leaving the rollers 43' and 44' will contain not more than about 50% of water.

After leaving the rollers 43' and 44', the absorbent belts 37 and 37' carry the cooked and partially dry potato product beneath rotary brushes 45 and 45' mounted in bearings on the frame and extending transversely of the belts. As the belts pass beneath the brushes, the brushes brush the potato product from the belts into a common sieve box 46 having a reticulated bottom. A rotary brush 47 extends lengthwise of the sieve box and brushes the potato product through the reticulated bottom into outwardly and downwardly-inclined chutes 48 and 48' which deliver the potato product in the form of discrete granules or a damp powder onto the upper surface of the returning lower flights of the absorbent belts 37 and 37'.

The brushes 45, 45' and 47 may be driven from an electric motor 49, mounted on the main frame, through suitable chain and sprocket or belt gearing 50.

In their return movement, the lower flights of the belts 37 and 37' pass through drying tunnels 51 and 51'. The tunnels are supplied with warm air from a warm-air manifold 52. The tunnels are also provided with internal heaters 53 to maintain the air at the proper temperature as it traverses the tunnels. The warm air is drawn through the tunnels by a fan 54. The inlet of the fan is connected to the respective tunnels through openings 55 and 56 and the discharge thereof is connected to the inlet end of the tunnel 11ᵃ, through which the potato skins are moving to be discharged from the apparatus. Thus, the warm air is caused to traverse the tunnels 51 and 51' where it dries the potato granules or powder, and then is discharged into the tunnel 11ᵃ to assist in the drying of the potato skins before their final discharge from the apparatus. The warm air eventually is discharged from the end of the tunnel 11ᵃ adjacent the chute 32.

The temperature maintained in the tunnel is such that by the time the potato granules or powder has traversed the length of the tunnels they will have been dried to the desired final moisture content, preferably to a moisture content of from 5% to 12%.

After leaving the tunnels 51 and 51', the belts 37 and 37' pass beneath transversely-extending rotary brushes 57 and 57', driven by an electric motor 58, which brush the dried potato product onto downwardly-inclined chutes 59 and 59' which deliver it to containers 60 and 60'.

A part of the moisture absorbed by the belts 37 and 37' as it is pressed from the potato threads by the rollers 43, 43', 44 and 44' will be dissipated to the surrounding atmosphere, while the remainder will be removed as the belts pass through the drying tunnels 51 and 51'.

From the foregoing description it will be understood that the raw, washed potatoes are fed from the hopper 17 onto the upper surface of the lower flight of the belt or band 8 which carries them through the cooking tunnel 11 where they are cooked to the desired extent. The cooked potatoes are delivered to the rotary elevators 20 and 20', which in turn discharge them onto the inclined guide plates 24 and 24' which deliver them to the well between the roll 26 and the upper flight of the belt 8 passing over the pulley 6. The potatoes are squashed in the bight between the roll 26 and the belt 8 and the potato pulp squeezed from the skins. The skins are carried by the upper flight of the belt through the tunnel 11ᵃ and discharged from the apparatus. The potato pulp passes through the perforations in the roll 26 to the inside of the roll and after being partially dried by a hot air blast, the resulting potato threads are delivered onto the upper flight of the water-absorbent belts 37 and 37' which carry them through the refrigerating apparatus where they are completely frozen to liberate the water from the starch gel resulting from the cooking of the potatoes. The potato threads then pass beneath the rollers 43, 43', 44 and 44'. These rollers finish the thawing of the potato threads and express from the threads a substantial portion of the water liberated from the starch gel by the freezing operation. On continued movement of the belts 37 and 37', the potato product is brought beneath the brushes 45 and 45', which brushes the potato product into the sieve box 46 where it is brushed through the reticulated bottom by the brush and passed by chutes 48 and 48' onto the upper surface of the returning lower flights of the belts 37 and 37'. The lower flights of the belts 37 and 37' then carry the potato granules resulting from the sieving operation through the drying tunnels 51 and 51' where they are given their final drying to reduce their moisture content to between 5 and 12%, preferably between 6 and 9%. After emerging from the final drying tunnels, the lower flights of the belts pass beneath rotary brushes 57 and 57' which brush the dry potato granules or powder into chutes 59 and 59' which deliver them to containers 60 and 60'.

The repeated dividing and remixing of the cooked potato pulp results in a blending of the product which assures a uniform final product.

To avoid unnecessary complications and to facilitate the understanding of the apparatus and its operation, the hood and enclosures and necessary fans for the removal of water vapor in balance with the rate and performance of evaporation have been omitted from the drawing.

The above description is of but a single apparatus embodying the invention. In many instances it will be found desirable to operate the apparatus in batteries. In such operation, it often will be found advantageous to have the several cooking tunnels connected to a single source of steam or other hot vapor, and to have a single source of warm air for supplying the final drying tunnels. Likewise, there may be a common source of supply of raw, washed potatoes to the respective hoppers 17, and common discharges for the final dry product, and the dried potato skins.

It will, of course, be understood that the size of the cooking belts or bands 8 and the other parts of the apparatus will be determined by the desired output and their operation will be properly coordinated to give the results described above, regardless of the output of the apparatus. For example, the rate at which the cooked potatoes are discharged from the cooking tunnel will control the size of the roll 26 and the pulley 6 over which the belt passes, which together bring about a removal of the skins from the potato pulp. These will also, in turn, vary with the size of the perforations in the roll 26, that is, the larger the perforations, the less is the necessity for rolls of large surface areas. In a similar manner, the thickness of the bed of material on the belts 37 and 37' must be related to the capacity for heat removal in the refrigerating apparatus, since, the thinner the bed of material, the quicker it will be frozen. Likewise, if the partially-dried potato product, when it reaches the brushes 45 and 45' has been reduced to about 60% of the product's then total weight, and preferably to 45% to 50% of the product's then total weight, it will readily pass through a sieve of 10 mesh, and preferably 20 mesh, and the final drying tunnels need then only be adjusted in size so as to permit the passage of air for the evaporation of the remaining amount of moisture to bring the final product down to the desired degree of dryness.

Contrary to prior teachings, the pressure factor to which the potatoes are subjected when passing between the roll 26 and the belt 8 during the separation of the pulp from the skins, nor the friction resulting from the potato pulp being forced through the perforations of the roll 26, does not result in any substantial breakage or rupture of the cells of the cooked potato; neither does the rapid freezing of the potato threads in the refrigerating apparatus 42 cause a disrupture of the cellular structure of the potato. This may be due to a partial removal of the water content of the potato threads, by evaporation in the roll 26, which seems to result in a toughening of the cell walls as well as reducing the amount of ice formation and the stresses occasioned thereby.

While the invention has been particularly described in connection with a preferred apparatus for treating potatoes to produce a dehydrated mashed potato powder in which the cellular structure of the potato is maintained intact, it is to be understood that the apparatus is of widespread application and is not limited to the treatment of potatoes or other starchy vegetables. It is, in fact, applicable for the treatment of any food or other product which requires the sequence of steps described above. Thus, potatoes are to be considered only as an example. Carrots, onions, parsnips, swede, turnips, cabbage, spinach, meat, fish, apples and other fruits are further examples of the more obvious products which lend themselves to beneficial application by the method and apparatus above described.

The apparatus of the invention also is useful where it is not desired to subject the foodstuff to all of the operations described above. For example, the freezing of the foodstuff could be eliminated merely by rendering the freezing apparatus 42 inoperative and permitting the belts 37 and 37' simply to travel through the refrigerating apparatus while it is in a non-operative condition. Also, the squeezing or pressing of the foodstuff by the rollers 43, 43', 44 and 44' may be eliminated merely by raising those rollers so that they are not operative as the belts 37 and 37' pass beneath them. Likewise, if desired, the partially-dried foodstuff could be brushed from the upper flight of the belts 37 and 37' and passed directly through the final drying tunnels 51 and 51' without being subjected to the sieving operation. If the foodstuff, for example, potatoes, is peeled before being introduced into the hopper 17, the co-action of the roller 26 and the belt 8 traveling over the pulley 6 will be for the sole purpose of converting the cooked and peeled potatoes into the desired threads for their subsequent treatment. If the foodstuff being treated is cabbage or any other leafy vegetable where it is not desired to separate the skin therefrom, the roller 26 may be replaced by a shreading roller which, will shread the cooked leafy foodstuff before it is partially dried and transferred onto the upper surface of the upper flight of the conveyor belts 37 and 37'. In the case of certain products, it may be desirable to dispense with the cooking of the foodstuff before being subjected to the subsequent treatments, in which case it is only necessary to shut off the supply of steam or other hot vapor to the manifolds 14 and 14' in the cooking tunnel 11. If the foodstuff being treated is one which it is not necessary to subject to a final drying operation, the air supplied to the tunnels 51 and 51' need not be heated and the heaters 53 need not be utilized. If the foodstuff is not to be subjected to the final drying operation, it may be removed from the conveyor belts 37 and 37' at any stage of the operation where the foodstuff has been treated to the desired extent.

It is also to be understood that various changes may be made in the details of construction of the apparatus described herein without departing from the invention or sacrificing any of the advantages thereof.

I claim:

1. Apparatus for treating foodstuff having a skin surrounding the pulp thereof which comprises an elongated cooking oven, and endless conveyor having one flight thereof movable lengthwise through the cooking oven for conveying foodstuff to be cooked therein, the end of the conveyor beyond the discharge end of the cooking oven passing over a pulley, means for separating the skin of the foodstuff from the pulp thereof, said skin-separating means comprising a hollow, perforated, rotatable roll mounted on an axis parallel to the axis of said pulley and having its periphery in close proximity to the conveyor band at a point where the conveyor band is in engagement with said pulley, whereby a pocket is formed between the perforated roll and the conveyor band just rearwardly of said point, means for rotating said pulley and the hollow perforated roll in opposite directions, means for transferring cooked foodstuff conveyed through the cooking oven to said pocket, whereby movement of the conveyor band at said pocket and the rotation of said roll forces the foodstuff into the bight between said conveyor and said roll and causes it to be subjected to pressure which ruptures the skin of the foodstuff and forces the pulp thereof through the perforations of the roll, while the skins are conveyed away by the moving conveyor, a dehydration chamber, and means for conveying pulp of the foodstuff which has been separated from the skin thereof to and through the dehydration chamber.

2. Apparatus as defined in claim 1 in which the means for separating the pulp of the foodstuff from the skin thereof is positioned at a higher level than that of the cooking oven and the means for passing the cooked foodstuff to the skin-separating means comprises an elevator having circumferential pockets rotatable about a horizontal axis, means for transferring the cooked foodstuff to said pockets and means for transferring the cooked foodstuff from said pockets to the pulp-separating means.

3. Apparatus as defined in claim 1 in which means are provided for freezing and thereafter thawing the pulp of the foodstuff after it has been separated from the skin thereof and before it enters the dehydration chamber.

4. Apparatus as defined in claim 1 in which means are provided for sieving the pulp of the foodstuff to form it into discrete particles before it enters the dehydration chamber.

5. Apparatus for treating foodstuff having a skin surrounding the pulp thereof which comprises a cooking oven having an entrance end and an exit end, an endless conveyor belt having one flight thereof extending through the cooking oven and extending therefrom at each end of the oven, means for supplying the foodstuff to be treated to said flight adjacent the entrance end of the oven, means for separating the skins from the pulp of the foodstuff comprising a rotatable perforated drum positioned closely adjacent said conveyor belt, means for causing the cooked foodstuff delivered from the exit end of the oven to pass to the bight between said perforated drum and the conveyor belt, whereby the cooked foodstuff is subjected to pressure, the skin ruptured and the pulp forced through the perforations of the drum, a dehydration chamber, an endless conveyor belt passing through said dehydration chamber, means for transferring the pulp of the foodstuff forced through the perforations of the drum to the conveyor belt which passes through the dehydration chamber to be carried by said conveyor belt through the dehydration chamber, and means for separately discharging the skins from which the foodstuff has been removed.

6. Apparatus for treating foodstuff as defined in claim 5 having pulleys over which the endless belt which extends through the cooking oven passes, and the rotatable perforated drum is positioned closely adjacent a place where the belt is passing over the pulley beyond the exit end of the oven.

7. Apparatus for treating foodstuff as defined in claim 5 including a freezing chamber through which the belt which extends through the dehydration chamber passes, and said freezing chamber is between the positions where the pulp is delivered thereto from the rotatable perforated drum and where the pulp carried by said belt enters the dehydration chamber.

8. Apparatus for treating foodstuff as defined in claim 5 which includes means for sieving the pulp of the foodstuff to form it into discrete particles before it enters the dehydration chamber.

9. Apparatus for treating foodstuff as defined in claim 5 which includes a heating chamber and the means for separately discharging the skins causes them to be passed through said heating chamber before they are discharged from the apparatus, whereby dehydration of the skins takes place before they are discharged from the apparatus.

References Cited in the file of this patent

UNITED STATES PATENTS

| | | |
|---|---|---|
| 1,025,373 | Cooke | May 7, 1912 |
| 1,295,161 | Heimerdinger | Feb. 25, 1919 |
| 1,295,162 | Heimerdinger | Feb. 25, 1919 |
| 1,443,367 | Kennedy | Jan. 30, 1923 |
| 2,027,977 | Hebley et al. | Jan. 14, 1936 |
| 2,201,514 | Akau | May 21, 1940 |
| 2,359,199 | Burnett | Sept. 26, 1944 |
| 2,381,838 | Rendle | Aug. 7, 1945 |
| 2,386,052 | Lundy | Oct. 2, 1945 |
| 2,523,552 | Birdseye | Sept. 26, 1950 |
| 2,564,296 | Bostock | Aug. 14, 1951 |
| 2,572,761 | Rivoche | Oct. 23, 1951 |